United States Patent [19]

Le Berre

[11] Patent Number: 5,588,058

[45] Date of Patent: Dec. 24, 1996

[54] METHOD AND DEVICE FOR SCRAMBLING AND DESCRAMBLING OF A SPECIFIC TELEVISION BROADCAST

[75] Inventor: Jacques Le Berre, Puteaux, France

[73] Assignee: U.S. Philips Corporation, New York, N.Y.

[21] Appl. No.: 219,055

[22] Filed: Mar. 29, 1994

[30] Foreign Application Priority Data

Mar. 31, 1993 [FR] France ................................. 93 03777

[51] Int. Cl.⁶ ................................................ H04N 7/167
[52] U.S. Cl. ................................ 380/20; 380/10; 380/16; 348/10; 348/55
[58] Field of Search ..................... 380/10, 16, 19, 380/20, 21, 22, 48; 348/10, 5.5

[56] References Cited

U.S. PATENT DOCUMENTS

| | | | |
|---|---|---|---|
| 5,029,207 | 7/1991 | Gammie | 380/16 X |
| 5,105,268 | 4/1992 | Yamanouchi et al. | 348/10 |
| 5,134,656 | 7/1992 | Kudelski | 380/48 |
| 5,367,571 | 11/1994 | Bowen et al. | 348/10 X |

FOREIGN PATENT DOCUMENTS 2132860   7/1984   United Kingdom ............. H04K 1/00

*Primary Examiner*—David C. Cain
*Attorney, Agent, or Firm*—Michael J. Balconi-Lamica

[57] ABSTRACT

A receiving device comprises a pseudo-random generator (18) initialized by a control word (CW) and a memory card reader (19). In accordance with the invention, it reads control word in a table of numbers contained in a read-only memory of a memory card (17) by utilizing a mode which is chosen from among several different modes, receives from the transmitter a signal which indicates the choice made in respect of said mode at a given instant.

12 Claims, 1 Drawing Sheet

5,588,058

METHOD AND DEVICE FOR SCRAMBLING AND DESCRAMBLING OF A SPECIFIC TELEVISION BROADCAST

BACKGROUND OF THE INVENTION

The invention relates to a method of scrambling, at the level of a transmitter, and descrambling, at the level of receivers, a specific television broadcast of limited duration, scrambling being performed by means of a pseudo-random generator which is initialized by a control word, descrambling involving the reconstruction upon reception, by means of a memory card device, of the control word which initializes a pseudo-random generator which is identical to that of the transmitter, said pseudo-random generator supplying the data necessary for descrambling. The invention also relates to a transmitter device for use in carrying out the method in accordance with the invention, said transmitter device comprising a pseudo-random generator which is initialized by a control word, and to a receiving device for use in carrying out the method in accordance with the invention, said receiving device comprising a pseudo-random generator which is initialized by a control word, and comprising a memory card reader. This method and these devices are used in scrambled television transmission and reception systems.

A television scrambling method of this kind is known from GB-P-2 132 860 (British Broadcasting Corp.). In this satellite television system, the control word is formed in a fully random manner and is transmitted in encrypted form to the receivers. The latter decrypt the control word by way of a calculation which is performed in an "smart" card by a process which is known per se, in this case being the so-called "DES" process with a secret key. Moreover, each card has a different identification code.

SUMMARY OF THE INVENTION

It is an object of the present invention to allow to use cards which are intended to be used only once, that is to say cards which enable the descrambling of the reception of the television broadcast of a specific, single event. Therefore, these cards must be very inexpensive; however their protection may be comparatively weak because after the single use they will become completely unusable anyway. Prior art cards provided with a processor would be too expensive for such an application and the use of a different identifier code for each card would imply a distribution and control system which is too complex.

The object of the invention is achieved by means of a method which is characterized in that in advance there are defined a table of numbers and different feasible modes of generating a control word by reading said table, and that this table is written into a read-only memory in descrambling cards issued to the users of receivers, after which at the instant of said specific television broadcast program the mode of reading a control word in said table is chosen in real time from among the various predefined feasible modes, which control word is read in conformity with said mode in order to supply it to the transmitter in real time, and immediately a signal is broadcast to the receivers so as to indicate the relevant mode of extracting the control word from the table, as a result of which the receivers generate this control word according to the indicated mode from a card comprising a simple memory in which said table of numbers is written.

Thus, the card comprises only a simple memory and is very inexpensive. The only practical means of invading its confidentiality would be the fraudulent reproduction (and sale) of a large number of copies of a card, possibly procured in a standard manner ("cloning"). This can be counteracted by distributing the cards to the authorized users at the last moment only.

This method, used in exceptional cases whereas normally another scrambling method is used, in which other method the control word is transmitted in encrypted form so as to enable the receivers to reconstruct it by means of a key, is preferably characterized in that the same control word is used in the two methods and continues to be transmitted in encrypted form during the use of the method in accordance with the invention.

Thus, the normal customers of the transmitter concerned can consider it as if nothing else happens.

Preferably, there is also transmitted a signal which indicates that the transmission takes place in accordance with the method of the invention. Thus, a receiver of a user which does not have a subscription providing him with a smart card, can initiate a procedure based on the use of a card in accordance with the invention.

In a special embodiment said mode of extracting the control word from the table consists in indicating an address in this table and of a mode for reading as from this address.

According to different versions, the read mode consists in reading in descending order of addresses, or in reading a data element every n data locations, of in reading with an address value progression based on a calculation.

A transmitter device in accordance with the invention comprises a control word generator which comprises means for reading this word in a table of numbers by utilizing a mode from among several different feasible modes, means for choosing a desired mode from among said several feasible modes, and means for supplying the receivers with a signal indicating which choice has been made in respect of said mode at a given instant.

Preferably, said means for choosing a desired mode consist essentially of a random number generator. Thus, until the very last instant it is impossible to predict the control words.

A receiving device in accordance with the invention comprises means for reading the control word in a table of numbers table contained in a read-only memory of a memory card, utilizing a mode from among several different modes, means for receiving from the transmitter the signal indicating the choice made at a given instant in respect of said mode, and means for controlling the read mode of said means for reading the control word as a function of the signal received by said means for receiving the signal from the transmitter.

These and other, more detailed aspects of the invention will become apparent from the following description of a non-limitative embodiment.

DETAILED DESCRIPTION OF THE PREFERRED EMBODIMENTS OF THE INVENTION

The following description is given by comparison with and with reference to the standard scrambling system which is referred to as "Eurocrypt" and is intended notably for use in association with the standard "D2-MAC/Packets". Nevertheless, it will be evident that the invention can also be used with any other system of the same kind, and also with systems in which the video transmission is all-digital. A system of this kind may be considered in respect of two aspects: scrambling and encryption. Generally speaking, scrambling is performed on the video (or audio) signals and encryption concerns the signals serving as keys for defining or controlling the scrambling.

Figure 1:
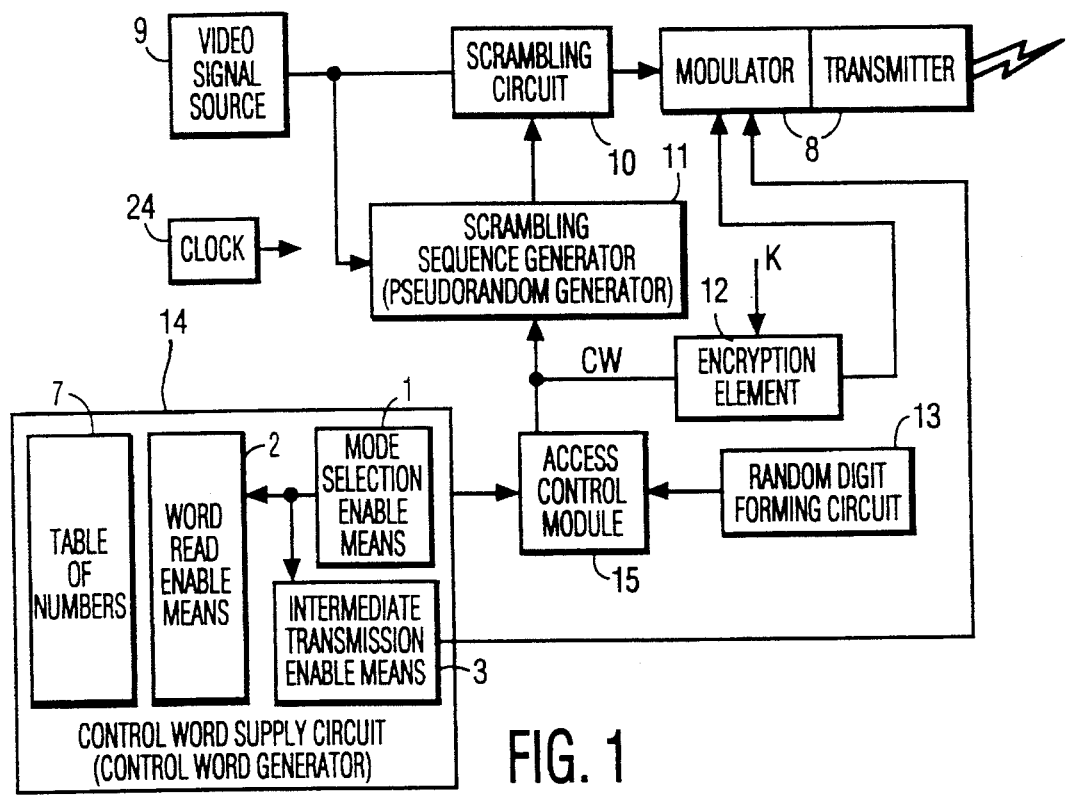
FIG. 1 shows a diagram of a scrambling device in accordance with the invention which enables the method in accordance with the invention to be carried out.

In the device whose diagram is shown in FIG. 1, the elements 8 to 12 are elements provided for the "EUROCRYPT" standard, and they are not modified for the method of the invention. The device comprises a video signal source 9 (for example, a camera or video recorder), which applies said video signals in the baseband to a scrambling circuit 10. In this context it suffices to note that the latter operates on the basis of a signal which is referred to as a "scrambling sequence" which fully determines how scrambling is to be realised. The signals thus scrambled are applied to a modulator/transmitter 8 for transmission in conformity with any known method.

Said scrambling sequence is generated and applied to the scrambler 10 by a scrambling sequence generator 11 which comprises notably a pseudo-random generator which is initialized by a control word CW and which also takes into account the number of the current frame which is applied thereto by the video source 9. The generator 11 is also of a non-modified, known type.

An access control module 15 applies said control word to the pseudo-random generator of the scrambling sequence generator 11. It also generates data which are transmitted to enable each receiver to proceed with the verifications necessary in respect of the right to receive the current transmission.

In the known systems the control word is formed in a fully random manner by a circuit 13 which forms random digits in known manner, for example, on the basis of the noise generated by a diode.

The control word is applied from the access control module 15 to the scrambling sequence generator circuit 11 and also to the modulator/transmitter 8 so as to be dispatched, via the transmission channel, in the form of digital packets according to the D2-MAC standard. It is to be noted that the control word CW is not transmitted in clear form but is encrypted by means of a key K in an encryption element 12 before being applied to the modulator/transmitter 8.

According to the method of the invention, the circuit 13 is not used directly and it is a circuit 14 which supplies the control words. The circuit 14 is a deterministic control word generator in a sense that the words generated thereby are not completely random but can be predicted subject to given conditions. Means 2 enable the reading of this word in a table of numbers 7, utilizing a mode from among several different predetermined modes. Means 1 enable the selection of a desired mode from among said several feasible modes. Said mode of extracting the control word from the table consists, for example in indicating an address in the table, and a read mode starting from this address. The read modes may notably be: backwards reading, reading of a byte from every n bytes (if reading takes place in bytes), reading with a progression of address value based on a calculation or on the reading of an address table. Means 3 enable immediate transmission to the receivers of a signal, indicating which mode of extracting the control word from the table has been chosen, in the form of digital indications which are transmitted to the modulator 8 so as to be dispatched via the transmission channel.

The means 1 are formed essentially by a circuit for generating two numbers at random, a first number which is between, for example 1 and 5 if there are 5 read modes, and a second number which is between 1 and 1024 if, for example, the table of numbers comprises 1024 numbers. The first number indicates the read mode and the second number indicates the starting address in the table. The means 1 may utilize the circuit 13 for generating the numbers in question. If reading goes beyond the end of the table, it continues with the start of the table.

The means 2 are formed essentially by a wired processor which generates the signals necessary for reading the table in the memory on the basis of the two numbers generated by the means 1.

The means 3 are connected to the general clock 24 of the device and supply, at the correct instant, serial-type data representing the relevant numbers to the modulator 8 so that they are transmitted, in the form of digital packets of the D2-MAC standard, by being added, for example to one of the messages which are referred to as "ECM" and which are provided for the transmission of data indicating the transmission characteristics. In these ECM messages the definition of given blocks, referred to as "PI" (parameter identifier), is still open so that it is readily possible to add such information thereto and still remain compatible with the standard.

Figure 2:
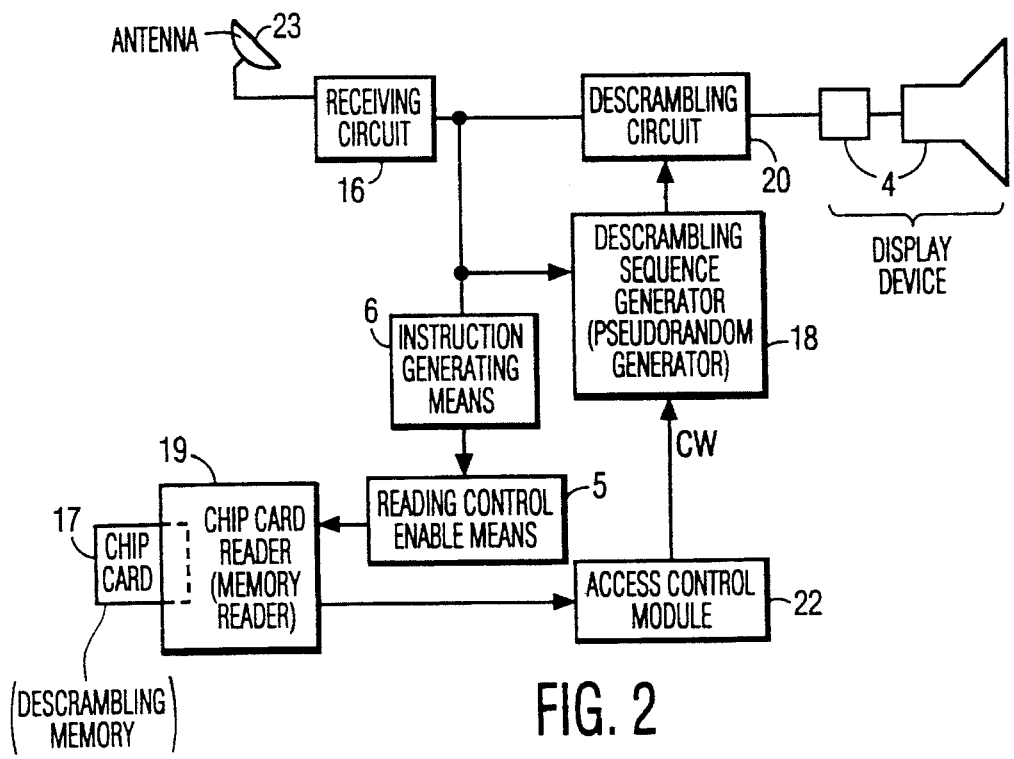
FIG. 2 shows a diagram of a descrambling device in accordance with the invention which enables the method in accordance with the invention to be carried out.

FIG. 2 shows a receiving device. It comprises a receiving circuit 16 which supplies baseband video signals from an antenna 23 for satellite reception (or an antenna for terrestrial reception which is not shown). The video signals are applied to a descrambling circuit 20. The circuit 20 is also of a known type and does not require a detailed description. It corresponds to the scrambling circuit 10. It operates on the basis of a signal which is referred to as a "descrambling sequence" and which completely determines how descrambling is to be performed. The signals thus descrambled are applied to a known display device 4.

Said descrambling sequence is generated and applied to the descrambling circuit 20 by a descrambling sequence generator 18 which comprises notably a pseudo-random generator which is initialized by a control word CW. The generator 18 is also of a known type.

An access control module 22 applies said control word to the pseudo-random generator of the descrambling sequence generator 18. It also performs all verifications necessary in view of the right of the receiver to receive the current transmission.

In accordance with the invention, the control word is read by means of a "chip card" reader 19 in a "chip card" 17. This card contains simply a read-only memory in which there is stored a table of numbers which is identical to the table 7 and it need not comprise an integrated microprocessor. The memory in question has a capacity of, for example one Kilobyte. Means 5 enable control of the reading of the control word in the table of numbers of the card 17 by utilizing an appropriate mode, indicated by the transmitter, from among several different predetermined modes. This mode is indicated in the form of a number contained in the data packets received by the receiver and applied to the means 6 by the receiving circuit 16. The means 6 generate an instruction which is adapted to the nature of the means 5 so as to obtain the desired mode of reading the data from among the various modes feasible.

The means 1, 2, 3, 5, 6 with their described functions readily can be implemented by those skilled in the art on the basis of their functions, each of which is known per se.

The scrambling of sound is realised with bit sequences generated on the basis of the same control word CW as the video signal. The control word CW formed in accordance with the invention is thus also used for scrambling the sound.

I claim:

1. A method of scrambling, at the level of a transmitter, and descrambling, at the level of receivers, a specific television transmission of limited duration, scrambling being performed by means of a pseudo-random generator which is initialized by a control word, descrambling involving the reconstruction upon reception, by means of a memory card device, of the control word which initializes a pseudo-random generator which is identical to that of the transmitter, said pseudo-random generator supplying the data necessary for descrambling, wherein in advance there are defined a table of numbers and different feasible modes of generating a control word by reading the table of numbers, and wherein the table is written into a read-only memory, the read-only memory being contained in descrambling cards issued to the users of receivers, after which at an instant of said specific television broadcast, the mode of reading a control word in the table is chosen in real time from among the various predefined feasible modes, which control word is read in conformity with said chosen mode in order to supply the control word to the transmitter in real tim, and immediately a signal is broadcast to the receivers so as to indicate a relavent mode of extracting the control word from the table, wherein the indicated mode corresponds to the chosen mode of the different feasible mode at the transmitter, as a result of which the receivers generate this control word according to the indicated mode from a descrambling card, the descrambling card comprising a simple memory in which the table of numbers is written.

2. A method as claimed in claim 1, used in exceptional cases and wherein the control word is a first control word, whereas another scrambling method having a second control word transmitted in encrypted form so as to enable the receivers to reconstruct it by means of a key is normally used, whereby the first control word is identical to the second control word and is recurrently transmitted in encrypted form.

3. A method as claimed in claim 2, wherein a signal indicating that the transmission takes place is also transmitted.

4. A method as claimed in claim 1, wherein said mode of extracting the control word from the table consists in indicating an address in this table and of a mode for reading as from this address.

5. A method as claimed in claim 4, wherein the read mode consists in reading in descending order of addresses.

6. A method as claimed in claim 4, wherein the read mode consists in reading a data element every n data locations.

7. A method as claimed in claim 4, wherein the read mode consists in reading with an address value progression based on a calculation.

8. A transmitter device comprising a pseudo-random generator which is initialized by a control word, and a control word generator, said control word generator comprises means for reading the control word in a table of numbers by utilizing a chosen mode from among several different feasible modes, means for choosing a desired mode from the several feasible modes, and means for supplying receivers with a signal indicating which choice has been made in respect of the chosen mode at a given instant.

9. A transmitter device as claimed in claim 8, wherein said means for choosing a desired mode consist essentially of a random number generator.

10. A receiving device comprising a pseudo-random generator which is initialized by a control word and a memory card reader, wherein said receiving device comprises means for reading the control word in a table of numbers contained in a read-only memory of a descrambling memory card, utilizing a mode to be chosen from among several different modes, means for receiving from a transmitter a signal indicating the choice made at a given instant in respect of the chosen mode, and means for controlling a read mode of said means for reading the control word as a function of the signal received by said means for receiving the signal from the transmitter.

11. A method as claimed in claim 2, wherein said mode of extracting the first control word from the table comprises indicating an address in this table and a mode for reading as from the address.

12. A method as claimed in claim 3, wherein said mode of extracting the first control word from the table comprises indicating an address in this table and a mode for reading as from the address.

\* \* \* \* \*